(12) United States Patent
Sen et al.

(10) Patent No.: US 10,885,941 B1
(45) Date of Patent: Jan. 5, 2021

(54) ADAPTING RUNTIME AND PROVIDING CONTENT DURING AN ACTIVITY

(71) Applicant: Rovi Guides, Inc., San Jose, CA (US)

(72) Inventors: Susanto Sen, Karnataka (IN); Shakir Sharfraz Ashfaq Ahamed, Karnataka (IN); Sriram Ponnusamy, Bengaluru (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/554,093

(22) Filed: Aug. 28, 2019

(51) Int. Cl.
| | |
|---|---|
| *G11B 27/00* | (2006.01) |
| *G11B 27/34* | (2006.01) |
| *H04N 21/4402* | (2011.01) |
| *H04N 21/4147* | (2011.01) |
| *H04N 21/435* | (2011.01) |
| *H04N 21/6587* | (2011.01) |

(52) U.S. Cl.
CPC ............ *G11B 27/005* (2013.01); *G11B 27/34* (2013.01); *H04N 21/4147* (2013.01); *H04N 21/4358* (2013.01); *H04N 21/4402* (2013.01); *H04N 21/6587* (2013.01)

(58) Field of Classification Search
CPC .. G11B 27/005; G11B 27/34; H04N 21/4147; H04N 21/4358; H04N 21/4402; H04N 21/6587
See application file for complete search history.

(56) References Cited

U.S. PATENT DOCUMENTS

| | | | |
|---|---|---|---|
| 2006/0253210 A1 | 11/2006 | Rosenberg | |
| 2013/0173526 A1 | 7/2013 | Wong et al. | |
| 2015/0234571 A1* | 8/2015 | Lee | G06F 3/04847 715/721 |
| 2016/0225405 A1* | 8/2016 | Matias | G06F 16/78 |
| 2017/0056727 A1 | 3/2017 | Hoffman et al. | |
| 2017/0161380 A1 | 6/2017 | Hsu et al. | |
| 2017/0161381 A1 | 6/2017 | Hsu et al. | |
| 2018/0322905 A1* | 11/2018 | Cheng | H04N 21/47202 |

OTHER PUBLICATIONS

International Search Report and Written Opinion of PCT/US2020/047619 dated Oct. 9, 2020.

* cited by examiner

*Primary Examiner* — Thai Q Tran
*Assistant Examiner* — Sunghyoun Park
(74) *Attorney, Agent, or Firm* — Haley Guiliano LLP

(57) ABSTRACT

Methods and systems are described for identifying and adapting the playback speed of content to be provided during an activity. The methods and systems receive an input including a start cue indicating a start of an activity and access an average duration and an intensity score for the activity. Then the system calculates an adjusted average runtime for the activity based on the average duration and the intensity score and identifies one or more content items, the one or more content items having a total runtime equivalent to the adjusted average runtime for the activity. The system adjusts the playback speed of the identified one or more content items such that the total runtime of playback of the one or more content items matches the average duration for the activity and provides the one or more content items for consumption.

19 Claims, 6 Drawing Sheets

ADAPTING RUNTIME AND PROVIDING CONTENT DURING AN ACTIVITY

RELATED APPLICATIONS

This application is related to U.S. patent application Ser. No. 16/424,992, entitled "LEARNING ACTIVITY DURATION FOR PROVIDING CONTENT DURING ACTIVITY" and filed May 29, 2019, the content of which is incorporated herein by reference in its entirety.

BACKGROUND

The present disclosure relates to systems for providing content during an activity, and more particularly to systems and related processes for identifying and adapting the playback speed of content to be provided during an activity.

SUMMARY

Some digital devices are designed to facilitate delivery of content to a user. Multitasking with devices is often encouraged with the utilization of advanced hardware with increased memory and fast processors in devices. These digital devices—e.g., computers, telephones, smartphones, tablets, smartwatches, microphones (e.g., with a virtual assistant), activity trackers, e-readers, voice-controlled devices, servers, televisions, digital content systems, video game consoles, and other internet-enabled appliances—can help simplify, expedite, or supplement real-world tasks, e.g., upon a user's voice, touch, or other input.

Tasks and activities that are conducive to multitasking with a device may allow content consumption throughout the duration of an activity. Content like video, animation, music, audiobooks, playlists, podcasts, images, slideshows, games, text, and other media may be consumed by users at any time, as well as nearly in any place and during almost any activity (for better or worse). It is not uncommon to use a device to watch videos, read an article, or look at photographs while participating in another separate activity. The runtime of content items and the duration of an activity rarely, if ever, match naturally.

For example, a viewer may stream a portion of broadcast news during a quick breakfast. Another user may listen to part of a podcast during her morning commute and resume it on the way home. A viewer might watch most of last night's episode of his favorite fantasy TV show while riding an exercise bicycle. A family may sit down to a rushed dinner while watching a trivia-based game show on DVR. Content contemporaneously delivered and consumed, via a device, during an activity can entertain, educate, and enhance an activity, as well as save time, but the timing does not typically coincide well.

Lengths of content and an activity do not typically match. For instance, if the runtime of the content is longer than the duration of the activity, the content consumer may speed up the playback of the content in order to complete the content prior to completing the activity. Content consumed during an activity can enhance an activity, however, having to manually cue up content or create a media playlist to consume during an activity may diminish any benefits. Having to calculate time and adjust the playback speed may also diminish any benefits of consuming content during an activity. Identifying appropriate new, interesting, and/or unseen content with the playback speed adjusted to fill the time of an activity need not to be based on guesswork and need not be identified manually. An embodiment of the present invention can retrieve a duration of an activity, calculate an adjusted duration for the activity if content were to be played at an adjusted rate, and identify, adapt, and provide content for consumption at an adapted playback rate for the duration of that activity.

Playback speed of content may be adjusted in order to expedite or prolong runtime of the content. Content consumed at a faster playback speed of one-and-a-half times (1.5×) the normal playback speed would have a runtime of two-thirds the normal duration of the content. Content consumed at a slower playback speed of three-quarters times (0.75×) the normal playback speed would have a runtime of one and one-third the normal duration of the content. Content is typically created to be consumed at normal (1×) speed, but speed can be adjusted in order to fit a preference of the consumer. Typically, if a consumer of content adjusts the playback speed, the consumer speeds up the content playback in order to complete the content sooner. In some instances, a consumer may slow down playback, e.g., in order to better understand the content substance, such as when the content is consumed by children or non-native language students.

Methods and systems are described herein for identifying and adapting the playback speed of content to be provided during an activity. An activity engine receives an input including a start cue indicating a start of an activity and accesses an average duration and an intensity score for the activity. Then the activity engine calculates an adjusted average runtime for the activity based on the average duration and the intensity score, and a content curation engine identifies one or more content items, the one or more content items having a total runtime equivalent to the adjusted average runtime for the activity. The content curation engine adjusts the playback speed of the identified one or more content items such that the total runtime of playback of the one or more content items matches the average duration for the activity and provides the one or more content items for consumption.

A duration for an activity, e.g., a time an activity undergoes, may be referred to as an activity duration. In some embodiments, an activity duration may be input into a user profile, preferences, or settings for an application or operating system and stored in an activity database. In some embodiments, a duration of the activity is learned from prior timings of the activity, e.g., during training of the system. An embodiment may store and access one or more activity duration data structures in an activity database. An embodiment may use, e.g., an anonymized database of times from other users to estimate or predict an average activity duration or a default activity duration.

An intensity for the activity, in some embodiments, may be represented as an intensity score, e.g., a score of how intense the activity may be. For instance, an intensity score may be a score of 1, 2, or 3, a number between one and ten, a normalized decimal from zero to 1.0, a label of low, medium, or high, or any other measure of intensity.

In some embodiments, an intensity score may be used to identify an acceptable playback speed for content. For instance, an intensity score of 1 (on a scale of 1-3) may indicate a double (2×) playback speed is proper, an intensity score of 2 may indicate a one-and-a-half (1.5×) playback speed is proper, and an intensity score of 3 may indicate a one-and-a-quarter (1.25×) playback speed is proper. Such a relationship between intensity score and playback speed may indicate that less intense activities may allow faster playback speed and more intense activities may need a comparatively slower playback speed (yet still faster than normal) because, for example, it may be more difficult to follow content during a more intense activity. For instance, someone eating breakfast or drinking coffee (intensity score of 1 on a 1-3 scale) may be able to better comprehend a news program played at double speed than someone who is running at a pace of 8 minutes per mile (intensity score of 3). In some embodiments—for example, based on activities, genres of content, and/or viewer preferences—a relationship between intensity score and playback speed may be inversely related and/or follow a particular formula or algorithm.

In some embodiments, an intensity score may be used to identify or calculate a limit or a range of increased speeds that are acceptable for consuming content. For instance, an intensity score of 1 (on a scale of 1-3) may indicate a range of 1.75×-2× playback speed is allowed, an intensity score of 2 may indicate a range of 1.5×-1.75× playback speed is allowed, and an intensity score of 3 may indicate a range of 1.25×-1.5× playback speed is allowed. In some embodiments, a maximum value may be used for a range such as with an intensity score of 1 (on a scale of 1-3) may indicate a double (2×) playback speed is a maximum, an intensity score of 2 may indicate a one-and-a-half (1.5×) playback speed is a maximum, and an intensity score of 3 may indicate a one-and-a-quarter (1.25×) playback speed is a maximum. If an intensity score is associated with a range of playback speeds that are acceptable for consuming content during the activity, a larger number and variety of content can be curated.

An intensity score, in some embodiments, may be input into a user profile, preferences, or settings for an application or operating system and stored in an activity database. In some embodiments, an intensity score may be learned from prior performance of an activity, e.g., during training of the system. Some embodiments may store and access an intensity score in one or more activity duration data structures in an activity database. Some embodiments may use, e.g., an anonymized database of intensity scores from other users to estimate or predict an intensity score or a default intensity score.

An adjusted average runtime, in some embodiments, for the activity may be calculated by determining a playback speed associated with the intensity score of the activity and multiplying the average activity duration by the playback speed. For instance, if an activity duration is 20 minutes and has an intensity score that suggests one-and-a-half speed (1.5×) is proper, then an adjusted average runtime for the activity would be 30 minutes. In some embodiments, an adjusted average runtime for the activity may be a range of runtimes calculated by determining a range of playback speeds associated with the intensity score of the activity and multiplying the average activity duration by the minimum playback speed and the maximum playback speed, respectively, to determine a range of adjusted average runtimes. For instance, if an activity duration is 20 minutes and has an intensity score that suggests a range of 1.5×-1.75× playback speed is allowed, then an adjusted average runtime for the activity may be a range of 30-35 minutes.

Alternative approaches typically inconvenience a viewer. For instance, an approach may lengthen an activity duration to fit a longer program runtime. An approach may shorten an activity because a program runs short. Content curation and provision need not alter a duration of an activity.

One alternative approach to providing content during an activity may constantly deliver content without ever knowing if or when an activity ends. For instance, portions of radio or television broadcasts might be consumed during an activity where a user is apathetic about content substance or duration. A user may tune in to a portion of a 24/7 news network during breakfast or watch a syndicated rerun while working out on a rowing machine. Consuming this content may be more of a distraction from an activity or merely observed out of habit. When an activity ends the user might turn off the device, but such content may continue. While certain examples of such content may be valued highly by some, these may be considered unnecessary "background noise" to many others. Such content may also be delivered regardless of user preference and/or activity duration. Even narrow distinctions in content may make a difference to a user. For instance, a user might choose to listen to live sports talk radio discussing football during a drive to work when she might prefer to hear a podcast about her favorite soccer team if it were as convenient as tuning the radio. There are more potential benefits, such as higher entertainment value, more learning opportunities, and more efficient use of time, when the content is highly valued or tailored to a user and activity duration. Content providers can benefit, too, from delivering content to receptive audiences more efficiently.

An alternative approach may identify a variable runtime video with a duration similar to an activity and cut or extend the variable runtime video to fit within the duration. Such an approach may compel the user to watch an undesired or inappropriate video merely because the runtime matches the activity's duration. Such an approach may provide content that annoys a user with additional commercials or may deprive a user of many scenes when a video is cut too much.

Even with the alternative approaches, there exists a need for identifying preferred content with the playback speed adjusted to fill the time of an activity without relying on manual selection and guesswork in a way that does not affect an activity.

The start (and stop) of an activity may be signaled by a cue, e.g., a start cue or a stop cue. A cue may be identified as incorporated in or associated with an input. A cue may be explicit or implicit. For instance, an explicit start cue may be found in sound input with a user telling the system that the activity is beginning. An explicit start cue may also be found in touch input or visual/gesture input similarly signaling the start. An implicit start cue may be a found in sound input such as the sound of a cereal box pouring breakfast into a bowl. A cue may be explicit with a voice command denoting an activity such as using an exercise bicycle. An implicit start cue for starting an exercise bike activity may be a sound of the bicycle pedals or an initialization beep, or visual input identifying that a user is in position and/or has started exercising. A cue may be implicit by receiving an image indicating presence of items used in an activity such as an image capture of a cup or bowl indicating a start to breakfast or coffee. Cues may come from communication via audio equipment, image capture equipment, and/or via network connected devices. Using swimming as an example activity, an implicit start cue could be detection of water. While an explicit stop cue may be a voice command to stop an activity timer, an implicit stop cue may be the cessation of the sound from a treadmill or capture of an exerciser's movement away from the stationary bicycle seat. In some embodiments, an input received may, e.g., explicitly or implicitly, indicate an intensity of an activity, e.g., by volume, frequency, or regularity of input, sounds, or noise.

If an activity duration and intensity score are established in an activity database, a range of runtimes can be calculated by the activity engine, and content items can be identified and provided for consumption during the activity by, e.g., a content curation engine. A content curation engine may identify content items with runtimes equivalent to an adjusted average runtime calculated based on an average activity duration and intensity score. A runtime equivalent to an average runtime may include a runtime within a range of adjusted average runtimes as calculated. A runtime equivalent to an adjusted average runtime may include a runtime within a predetermined range, such as five percent (5%) or ten percent (10%), around an adjusted average runtime as calculated. A runtime equivalent to an adjusted average runtime may include a runtime within a predetermined range, such as a standard deviation, around an adjusted average runtime as calculated.

Content items, such as video, animation, music, audiobooks, playlists, podcasts, images, slideshows, games, text, and other media, can be played back-to-back for multitask viewing while performing the activity. Content may come from various sources including broadcast television and radio, cable, satellite, IPTV, over-the-top streaming services, video on demand, DVR, video sharing sites, social media, podcasts, blogs, live feeds, and other multimedia streams. Content typically has associated metadata or other information to identify whether a potential content consumer may be interested in the content. A content curation engine may be used to search for one or more programs that align with a user's interests. A user generally has preferences as to types, sources, substantive content, actors, producers, and other content descriptions that can be used to identify potential content items to provide during an activity if the content items fit in the expected activity duration. For instance, a user may be shown videos of a sports news recap and a segment of the weather report while exercising on a stationary bicycle, and the total runtime of the videos matches the duration of the exercising activity. Watching two videos, in this case totaling 37 minutes, may be beneficial to the user over watching the first part of one 44-minute episode of a cable drama television program (and later having to find at least seven minutes to finish the program) especially if the user indicates a preference for sports and weather updates in a profile or other settings. A user may have preferences to consume certain content, e.g., particular television programs or segments of videos, during specific variable duration activities.

Shorter-duration content, such as video clips, may be becoming more readily available, as anyone with a phone can become a content creator. Audiences' attention spans may be getting shorter. It may be more beneficial to a user to play a dozen video clips—e.g., updates on news, sports, fashion, health, comedy, cooking, etc.—than to watch only a portion of a longer television program. It is not reasonable or efficient for a user to manually create a playlist with desired content prior to each performance of an activity. Once a duration of an activity is established in an activity database and a range of acceptable adjusted runtimes can be calculated, multiple content items with a total runtime similar to the activity duration can be provided.

There may be situations where content consumers choose a particular program or content for consumption during a specific time period or activity. There may be situations where a content consumer often consumes undesired content merely out of convenience. There may be occasions where a content consumer allows an activity to be affected or adjusted based on the length of he content. By offering content personalized to a user and tailored to an activity and its expected duration, entertainment, education, and efficiency of time may increase. In some embodiments, an activity engine may use an activity duration and intensity score to calculate an adjusted average runtime based on a maximum speed and a content curation engine may identify content items and adapt the playback speed of the content items in order to provide preferred content that fits the duration of a desired activity.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
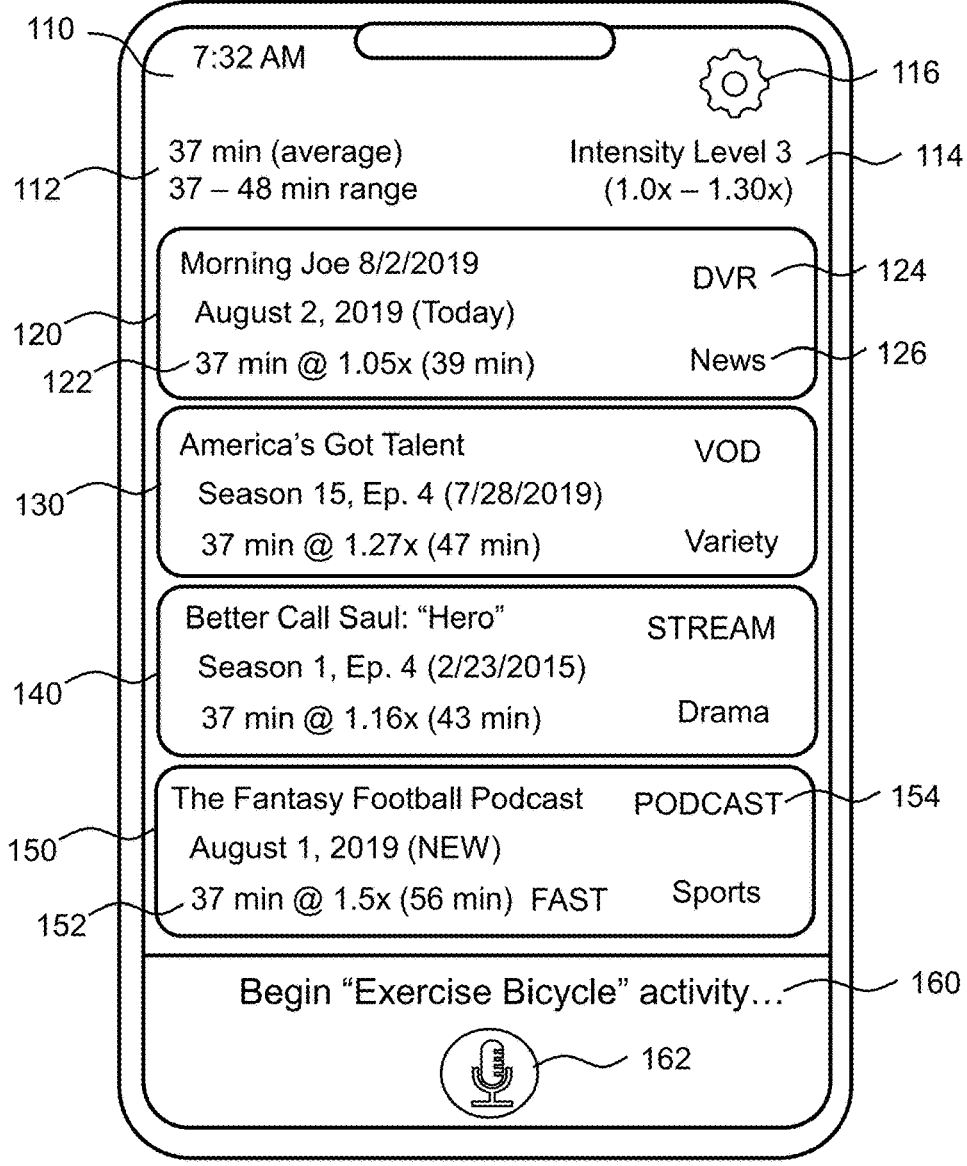
FIG. 1 depicts an illustrative scenario and user interface for providing content with an adapted runtime to match a duration of an activity, in accordance with some embodiments of the disclosure.

FIG. 1 depicts an illustrative scenario and user interface for providing content with an adapted runtime to match a duration of an activity, in accordance with some embodiments of the disclosure. For instance, scenario 100 portrays an application offering four programs of various runtimes to be, if selected, played back at corresponding speed adjustments to fit within an activity duration of 37 minutes upon receiving a cue for exercise bicycling.

Figure 5:
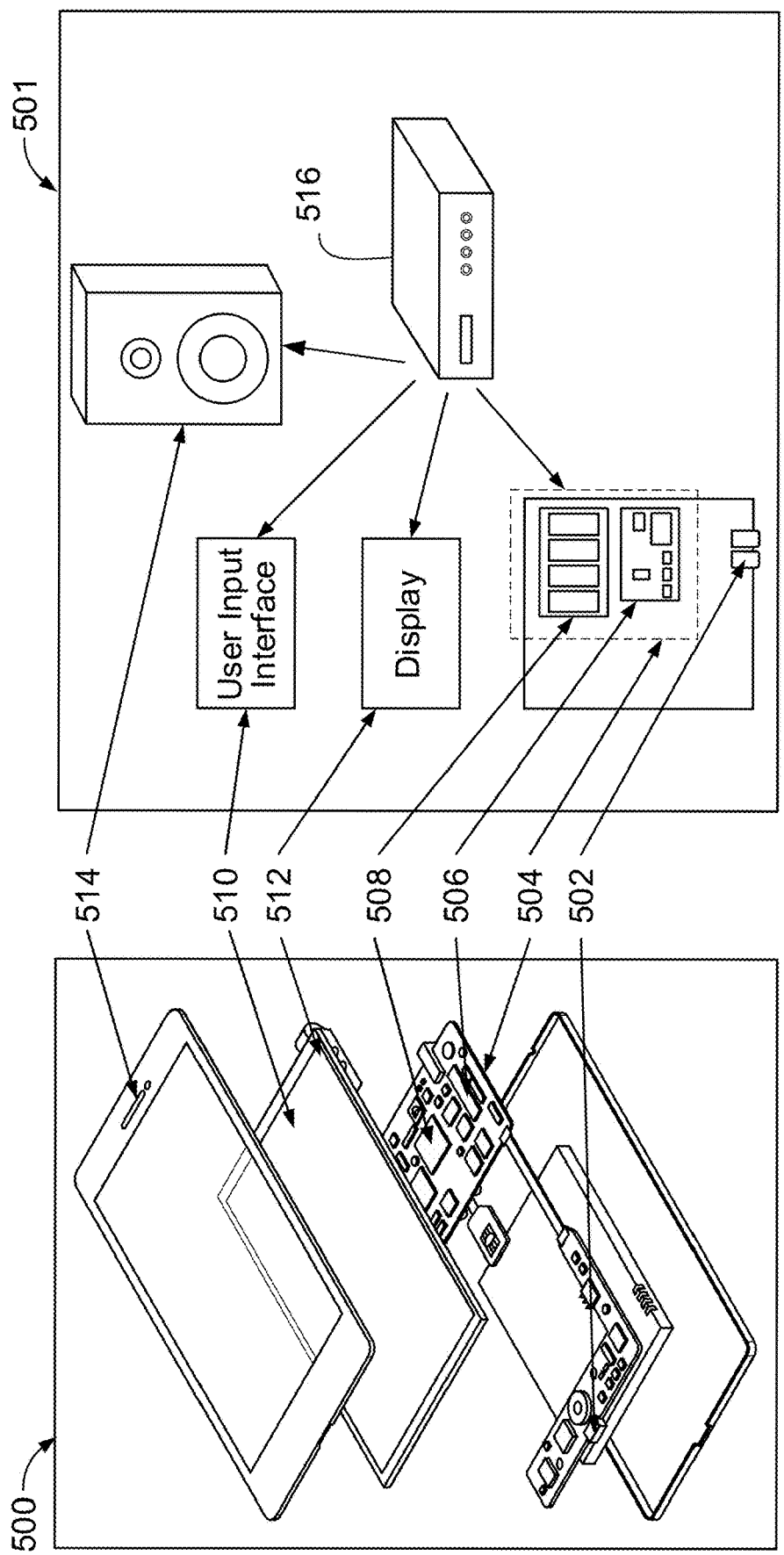
FIG. 5 is a diagram of an illustrative device, in accordance with some embodiments of the disclosure.
Figure 6:
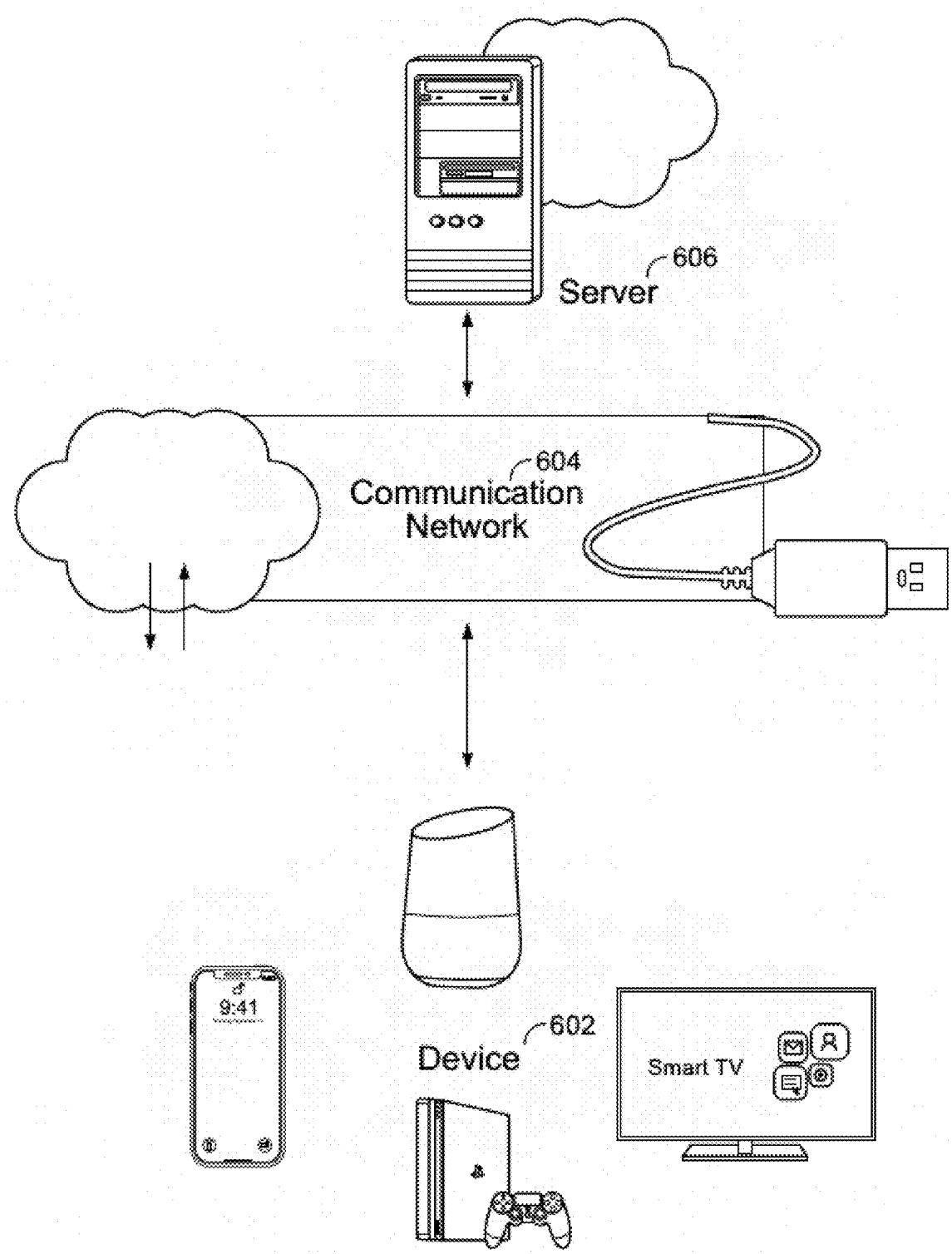
FIG. 6 is a diagram of an illustrative system, in accordance with some embodiments of the disclosure.

An exemplary embodiment is depicted in FIG. 1 as scenario 100 with smartphone 102. Smartphone 102 may be any other suitable device such as a personal computer, laptop, tablet, media center, video console, or any device as depicted in FIGS. 5 and 6.

Exemplary scenario 100 of FIG. 1 depicts an embodiment that provides content with playback speeds adapted to fit a duration of an initiated activity, e.g., cycling on a stationary exercise bicycle. Scenario 100 depicts smartphone 102 receiving input 103. In one or more embodiments, input 103 may be a voice command received by smartphone 102. In an embodiment, input 103 may be a button press or a gesture received by smartphone 102. In one or more embodiments, input 103 may include information identifying a user, e.g., by name or voice. In exemplary scenario 100, input 103 comprises begin cue 104. In an embodiment, input 103 may not comprise begin cue 104 and input 103 may be associated with begin cue 104. For example, an input gesture may trigger begin cue 104. In an embodiment, begin cue 104 may identify activity 108, e.g., "Begin 'Exercise Bike' activity . . . " and begin cue 104 and activity 108 may be recorded, e.g., in a database.

Scenario 100 also features an exemplary display screen of smartphone 102 with a content delivery application depicted as user interface 110. In some embodiments, the bottom of user interface 110 may depict activity label 160 to, e.g., indicate that smartphone 102 received begin cue 104 and acknowledges activity 108. An embodiment may use microphone icon 162 to indicate a potential for receiving input, such as a voice command or touch, that could, e.g., pause, resume, or end an activity. In some embodiments, a cue may be explicit with a voice command denoting an activity such as an exercise bicycle. In some embodiments, a cue may be implicit such as a sound signifying initiation of an activity, such as a noise from an exercise bicycle. In some embodiments, the input received may indicate an intensity of an activity, e.g., by volume, frequency, or regularity of input, sounds, or noise.

User interface 110 may feature duration data 112, which may include an average duration for the activity and/or an acceptable range for runtimes of content items to be proffered for consumption during activity 108. In some embodiments, duration data 112 may be retrieved from, e.g., an activity database.

User interface 110 may feature intensity data 114 which may include an intensity level for the activity and/or an acceptable range for speed adjustments for content items that may be proffered for consumption during activity 108. In some embodiments, intensity data 114 may be retrieved from, e.g., an activity database. In some embodiments, an acceptable range for speed adjustments for content items may be calculated based on intensity level for the activity and included as intensity data 114, which may be retrieved from, e.g., an activity database. In some embodiments, an acceptable range for speed adjustments for content items may be based on content type, genre, and/or other metadata.

In some embodiments, user interface 110 may feature content items, such as content items 120, 130, 140, and 150, as results provided for selection and/or consumption. In some embodiments, displayed content items, such as content items 120, 130, 140, and 150, may fit within an average duration for activity 108 as indicated by duration data 112 when the playback speed of each content item is adjusted (e.g., sped up). In some embodiments, displayed content items, such as content items 120, 130, 140, and 150, may fit within an acceptable range for runtimes for activity 108 as indicated by duration data 112 at normal speed, but calculated to fit within an average duration when the playback speed of each content item is adjusted (e.g., sped up).

In some embodiments, user interface 110 may depict each content item with relevant metadata and/or runtime data. For instance, user interface 110 may include a program title, a program date, description, channel, or other relevant programming information. In some embodiments, user interface 110 may feature content item 120, among other content items, with time indicator 122 identifying the duration is 37 minutes at a speed of 1.05 faster than when played at normal speed (e.g., a full 39 minutes). In some embodiments, a content item may include a source indicator such as source indicator 124 or source indicator 154. In some embodiments, a content item may include a genre indicator such as genre indicator 126.

In some embodiments, user interface 110 may depict a settings icon such as settings icon 116. In some embodiments, settings icon 116 may lead to another interface or an overlay to allow adjustment of, e.g., activities, activity duration times, playback speed preferences, playback speed limitations, content type preferences, content genre preferences, and other content and playback options and settings.

Figure 2:
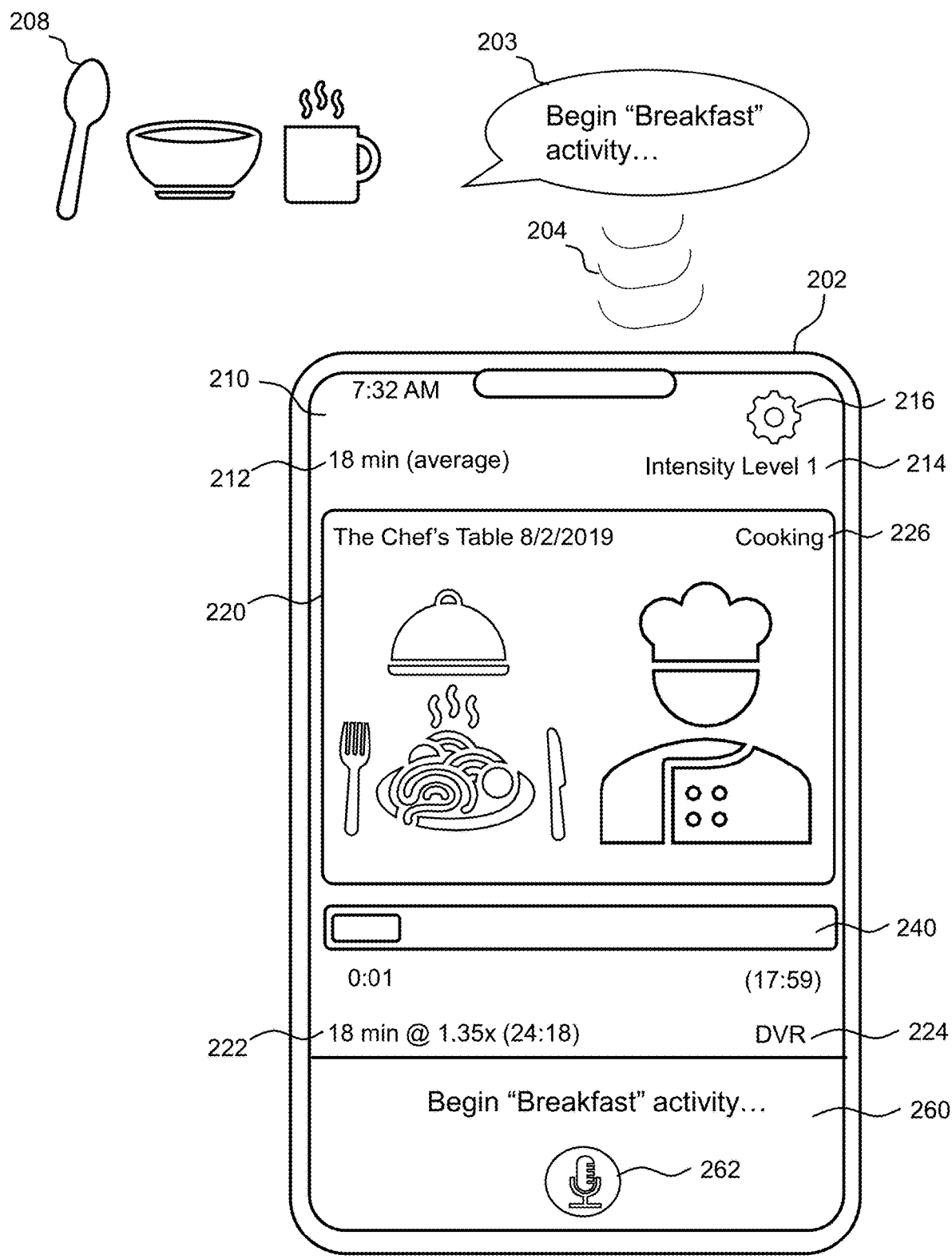
FIG. 2 depicts an illustrative scenario and user interface for providing content with an adapted runtime to match a duration of an activity, in accordance with some embodiments of the disclosure.

FIG. 2 depicts an illustrative scenario and user interface for providing content with an adapted runtime to match a duration of an activity, in accordance with some embodiments of the disclosure. For instance, scenario 200 portrays an application playing back a 24-minute cooking program stored on a DVR at one-and-thirty-five-hundredths times (1.35×) the normal speed to fit within an activity duration of 18 minutes upon receiving a cue for breakfast.

An exemplary embodiment is depicted in FIG. 2 as scenario 200 with smartphone 202. Smartphone 202 may be any other suitable device such as a personal computer, laptop, tablet, media center, video console, or any device as depicted in FIGS. 5 and 6.

Exemplary scenario 200 of FIG. 2 depicts an embodiment that provides content with a playback speed adapted to fit a duration of an initiated activity, e.g., eating breakfast. Scenario 200 depicts smartphone 202 receiving input 203. In one or more embodiments, input 203 may be a voice command received by smartphone 202. In an embodiment, input 203 may be a button press or a gesture received by smartphone 202. In one or more embodiments, input 203 may include information identifying a user, e.g., by name or voice. In exemplary scenario 200, input 203 comprises begin cue 204. In an embodiment, input 203 may not comprise begin cue 204 and input 203 may be associated with begin cue 204. For example, an input gesture may trigger begin cue 204. In an embodiment, begin cue 204 may identify activity 208, e.g., "Begin 'Breakfast' activity . . . " and begin cue 204 and activity 208 may be recorded, e.g., in a database.

Scenario 200 also features an exemplary display screen of smartphone 202 with a content delivery application depicted as user interface 210. In some embodiments, the bottom of user interface 210 may depict activity label 260 to, e.g., indicate that smartphone 202 received begin cue 204 and to acknowledge activity 208. An embodiment may use microphone icon 262 to indicate a potential for receiving input, such as a voice command or touch, that could, e.g., pause, resume, or end an activity. In some embodiments, a cue may be explicit. In some embodiments, a cue may be implicit. In some embodiments, the input received may indicate an intensity of an activity, e.g., by volume, frequency, or regularity of input, sounds, or noise.

User interface 210 may feature duration data 212, which may include an average duration for the activity provided for consumption during activity 208. In some embodiments, duration data 212 may be retrieved from, e.g., an activity database.

User interface 210 may feature intensity data 214, which may include an intensity level for the activity and/or an acceptable range for speed adjustments for content items that may be provided for consumption during activity 208. In some embodiments, intensity data 214 may be retrieved from, e.g., an activity database. In some embodiments, an acceptable range for speed adjustments for content items may be calculated based on intensity level for the activity and included as intensity data 214, which may be retrieved from, e.g., an activity database. In some embodiments, an acceptable range for speed adjustments for content items may be based on content type, genre, and/or other metadata.

In some embodiments, user interface 210 may feature content item 220 provided for consumption. In some embodiments, displayed content item 220 may match an average duration for activity 208 as indicated by duration data 212 when the playback speed of content item 220 is adjusted (e.g., sped up). In some embodiments, displayed content item 220 may fit within an acceptable range for runtimes for activity 208 as indicated by duration data 212 at normal speed, but calculated to fit within an average duration when the playback speed of content item 220 is adjusted (e.g., sped up).

In some embodiments, user interface 210 may depict each content item with relevant metadata and/or runtime data. For instance, user interface 210 may include a program title, a program date, description, channel, or other relevant programming information. In some embodiments, user interface 210 may feature content item 220, among other content items, with time indicator 222 identifying the duration is 18 minutes at a speed of 1.35 times faster (1.35×) than when played at normal speed (e.g., 24 minutes, 18 seconds). In some embodiments, a content item may include a source indicator, such as source indicator 224. In some embodiments, a content item may include a genre indicator, such as genre indicator 226. In some embodiments, a content item may include a slider bar such as slider bar 240 to indicate duration and time left for playback of content item 220. In some embodiments, slider bar 220 may demonstrate time progress at a normal rate and/or at an adjusted rate.

In some embodiments, user interface 210 may depict a settings icon such as settings icon 216. In some embodiments, settings icon 216 may lead to an another interface or an overlay to allow adjustment of, e.g., activities, activity duration times, playback speed preferences, playback speed limitations, content type preferences, content genre preferences, and other content and playback options and settings.

Figure 3:
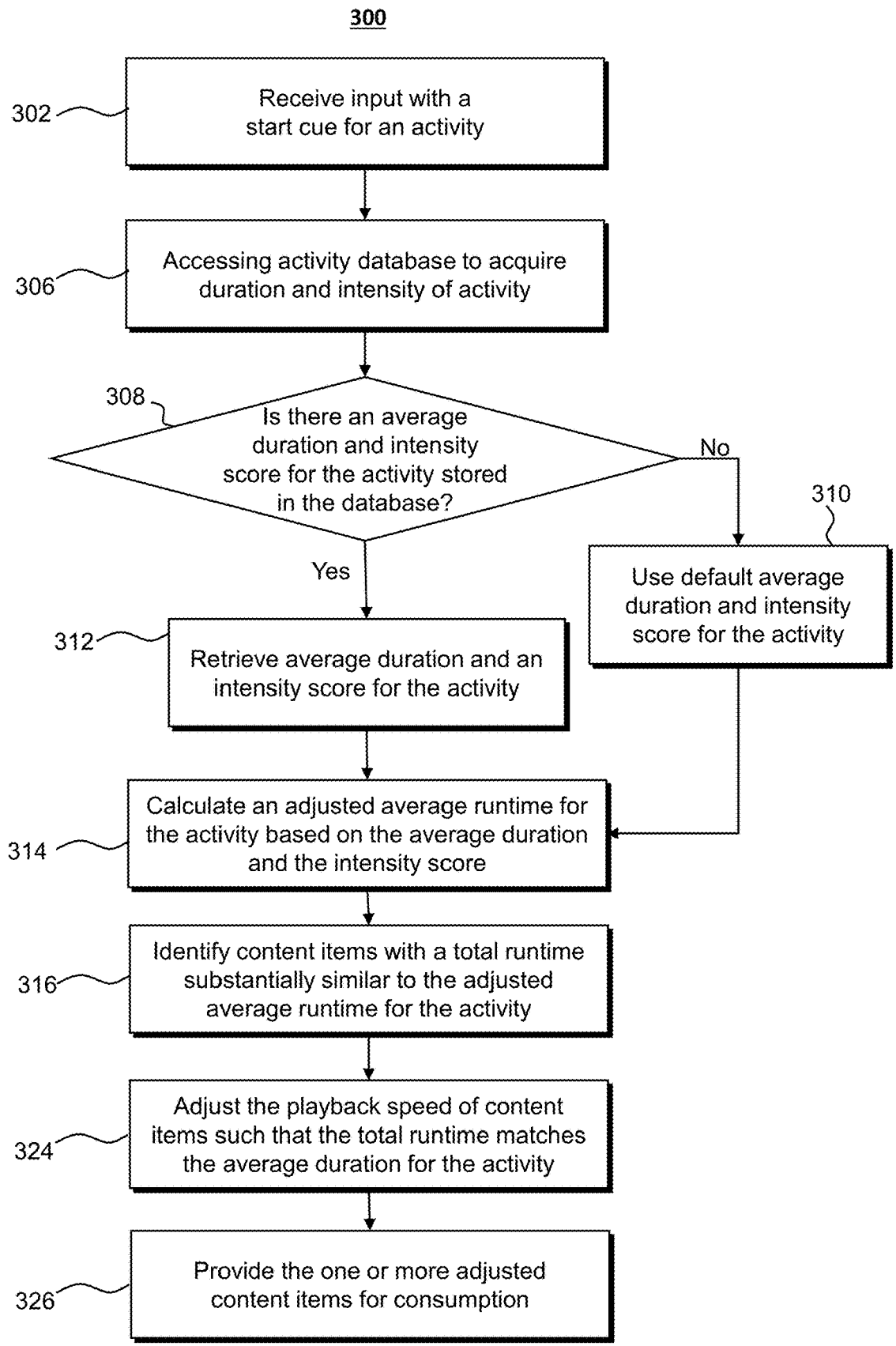
FIG. 3 depicts an illustrative flowchart of a process for providing content with an adapted runtime to match a duration of an activity, in accordance with some embodiments of the disclosure.

FIG. 3 depicts an illustrative flowchart of a process for providing content with an adapted runtime to match a duration of an activity, in accordance with some embodiments of the disclosure. An embodiment may include, for instance, an activity engine and a content curation engine carrying out the steps depicted in the flowchart of FIG. 3. For example, in scenario 300 of FIG. 3, an activity engine retrieves a duration for an activity and calculates an adjusted average runtime and a content curation engine identifies and adapts the playback speed of content to provide content for the duration of the activity. In scenario 300, a system, e.g., an activity engine and/or a content curation engine, may be any other suitable device such as a personal computer, laptop, tablet, media center, video console, or any device as depicted in FIGS. 5 and 6.

At step 302 of scenario 300, the activity engine receives input with a start cue for an activity. At step 306, the activity engine accesses an activity database in order to acquire a duration and an intensity for the activity.

In some embodiments, a duration for an activity may be an activity duration, e.g., a time the activity lasts. In some embodiments, an activity duration may be input into a user profile, preferences, or settings for an application or operating system and stored in an activity database.

In some embodiments, an intensity for the activity may be an intensity score, e.g., a score of how intense the activity may be. For instance, an intensity score may be a score of 1, 2, or 3, a number between one and ten, a normalized decimal from zero to 1.0, a label of low, medium, or high, or any other measure of intensity.

In some embodiments, an intensity score may be used to identify an acceptable playback speed for content. For instance, an intensity score of 1 (on a scale of 1-3) may indicate a double (2×) playback speed is proper, an intensity score of 2 may indicate a one-and-a-half (1.5×) playback speed is proper, and an intensity score of 3 may indicate a one-and-a-quarter (1.25×) playback speed is proper. In some embodiments—e.g., based on activities, genres of content, and/or viewer preferences—a relationship between intensity score and playback speed may be proportional, inversely related, and/or follow a particular formula or algorithm.

In some embodiments, an intensity score may be used to identify or calculate a limit or a range of speeds that are acceptable for consuming content. For instance, an intensity score of 1 (on a scale of 1-3) may indicate a range of 1.75×-2× playback speed is allowed, an intensity score of 2 may indicate a range of 1.5×-1.75× playback speed is allowed, and an intensity score of 3 may indicate a range of 1.25×-1.5× playback speed is allowed. If an intensity score is associated with a range of playback speeds that are acceptable for consuming content during the activity, a larger number and variety of content can be curated.

At step 308, the activity engine determines if there is an average duration for the activity stored in the activity database. If there is no average activity duration and intensity score for the activity stored in the database then, at step 310, the activity engine uses a default average duration and a default intensity score for the activity. In some embodiments, a default average duration and a default intensity score for the activity may be based on an average duration and an intensity score for another activity with, e.g., similar keywords or other characteristics. If there is an average activity duration and intensity score for the activity stored in the database then, at step 312, the activity engine retrieves the average duration and intensity score for the activity.

At step 314, the activity engine calculates an adjusted average runtime for the activity based on the average duration and the intensity score. In some embodiments an adjusted average runtime for the activity or a range of runtimes may be calculated by determining a playback speed associated with the intensity score of the activity and multiplying the average activity duration by the playback speed. For instance, if an activity duration is 20 minutes and has an intensity score that suggests a range of 1.5×-1.75× playback speed is allowed, then an adjusted average runtime for the activity may be a range of 30-35 minutes.

At step 316, the content curation engine identifies content items with a total runtime equivalent to the adjusted average runtime for the activity. For instance, in some embodiments, the content curation engine identifies content items with a total runtime within the adjusted average runtime range for the activity.

At step 324, the content curation engine adjusts the playback speed of content items such that the total runtime matches the average duration for the activity. For instance, in some embodiments, the content curation engine may speed up (or slow down) playback speed of the content so that the total runtime of playback of the one or more content items is equivalent to the average duration for the activity.

At step 326, the content curation engine provides the one or more adjusted content items for consumption. For instance, in some embodiments, the content curation engine may provide a list of the adjusted content items to be selected and played. In some embodiments, the content curation engine may organize and provide a list of the adjusted content items based on a profile of content preferences. In some embodiments, the content curation engine may select a top match of the adjusted content items based on a profile of content preferences and provide corresponding content.

Figure 4:
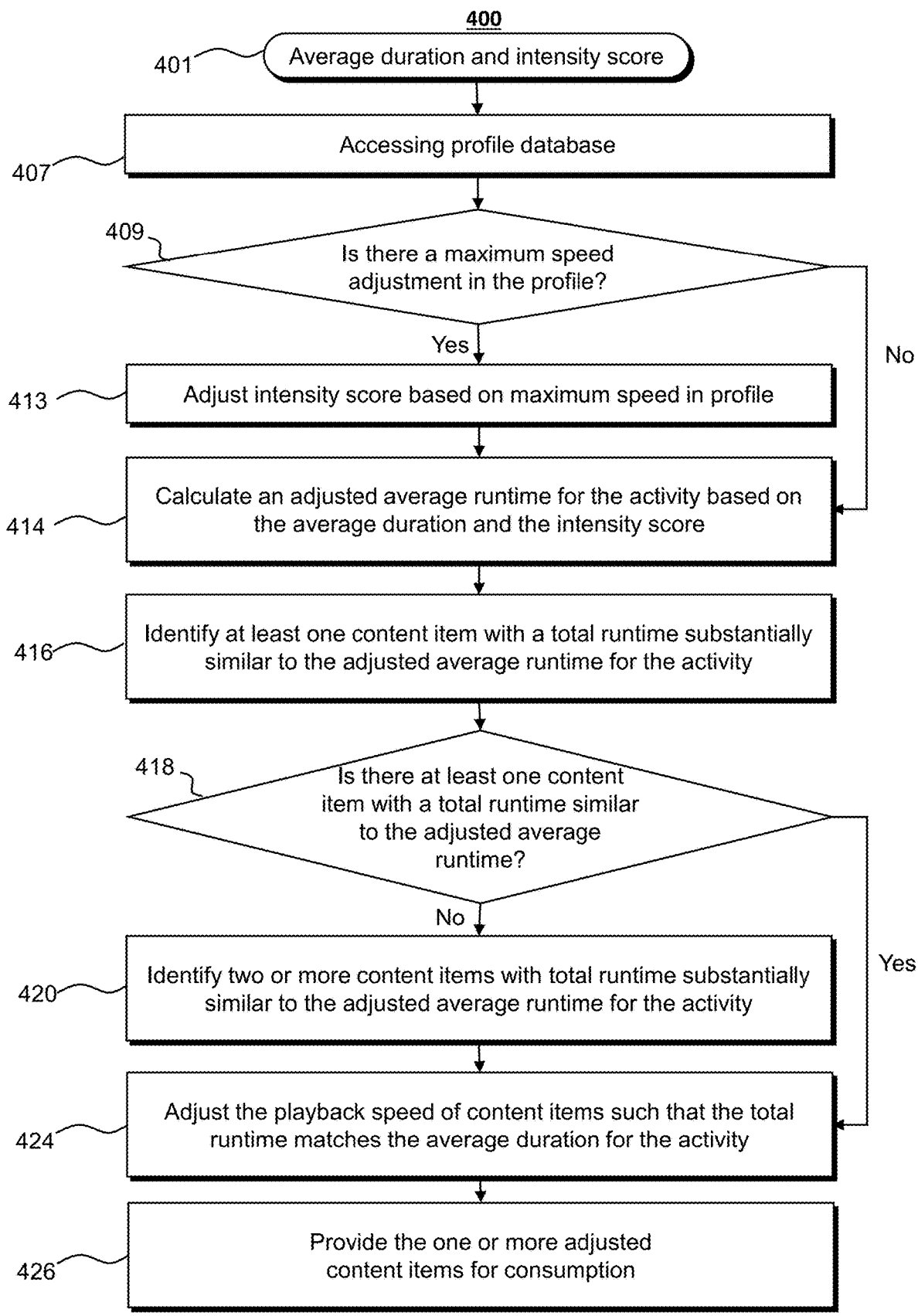
FIG. 4 depicts an illustrative flowchart of a process for providing content with an adapted runtime to match a duration of an activity, in accordance with some embodiments of the disclosure.

FIG. 4 depicts an illustrative flowchart of a process for providing content with an adapted runtime to match a duration of an activity, in accordance with some embodiments of the disclosure. An embodiment may include, for instance, an activity engine and a content curation engine carrying out the steps depicted in the flowchart of FIG. 4.

For example, in scenario 400 of FIG. 4, an activity engine uses an activity duration and intensity score to calculate an adjusted average runtime based on a maximum speed and a content curation engine identifies content items and adapts the playback speed of the content items. In scenario 400, a system, e.g., an activity engine and/or a content curation engine, may be any other suitable device such as a personal computer, laptop, tablet, media center, video console, or any device as depicted in FIGS. 5 and 6.

At step 401 of scenario 400, the activity engine is provided an average duration and an intensity score. In some embodiments, for instance, an average duration and an intensity score are retrieved from an activity database. In some embodiments, an average duration and an intensity score are default values. At step 407, the activity engine accesses a profile database. In some embodiments, a profile database may be a user profile, preferences, or settings for an application or operating system. In some embodiments, a profile database may be stored as, e.g., part of an activity database.

At step 409, the activity engine determines if there is a maximum speed adjustment in the profile. In some embodiments, for instance, a profile may indicate that playback speed may not exceed a specific factor of increase. For example, in some embodiments, a profile may indicate a maximum playback speed of double (2×) the normal (1×) speed. In some embodiments, a profile may indicate that playback speed may not exceed a specific factor of increase for certain content types, genres, and/or activities. For example, in some embodiments, a profile may indicate a maximum playback speed of two-and-a-half times (2.5×) the normal (1×) speed for, e.g., podcasts or audiobooks. For example, in some embodiments, a profile may indicate a maximum playback speed of one-and-a-half times (1.5×) the normal speed for, e.g., sports. For example, in some embodiments, a profile may indicate a maximum playback speed of one-and-a-tenth times (1.1×) the normal speed for, e.g., dramas. For example, in some embodiments, a profile may indicate a maximum playback speed of one-and-a-third times (1.33×) the normal speed when the activity is, e.g., running on a treadmill.

In some embodiments, a profile may indicate that playback speed may not exceed a specific factor of increase by adjusting the intensity score. At step 413, if a maximum speed adjustment is found in the profile, the activity engine adjusts the intensity score based on maximum speed in profile. In some embodiments, the activity engine may adjust the intensity score by lowering it. In some embodiments, the activity engine may adjust the intensity score by weighting it. If no maximum speed adjustment is found in the profile, no adjustment is made by the activity engine.

At step 414, the activity engine calculates an adjusted average runtime for the activity based on the average duration and the intensity score. In some embodiments, an adjusted average runtime for the activity may be calculated by determining a playback speed or range of playback speeds associated with the intensity score of the activity and multiplying the average activity duration by the playback speed.

At step 416, the content curation engine identifies content items with a total runtime equivalent to the adjusted average runtime for the activity. For instance, in some embodiments, the content curation engine identifies content items with a total runtime within the adjusted average runtime range for the activity.

At step 418, the content curation engine determines if there is at least one content item with a total runtime similar to the adjusted average runtime. If there is not at least one content item with a total runtime similar to the adjusted average runtime then, at step 420, the content curation engine identifies two or more content items with a total runtime together that is equivalent to the adjusted average runtime for the activity. If there is at least one content item with a total runtime similar to the adjusted average runtime then the identified content items are used at step 424.

At step 424, the content curation engine adjusts the playback speed of content items such that the total runtime matches the average duration for the activity. For instance, in some embodiments, the content curation engine may speed up (or slow down) playback speed of the content so that the total runtime of playback of the one or more content items is equivalent to the average duration for the activity. In some embodiments, when there is not at least one content item with a total runtime similar to the adjusted average runtime and, at step 420, the content curation engine identifies two or more content items with a total runtime together that is equivalent to the adjusted average runtime for the activity, then the content curation engine may speed up playback speed of each content item to fit in the allotted time duration.

At step 426, the content curation engine provides the content items for consumption. For instance, in some embodiments, the content curation engine may provide a list of the adjusted content items to be selected and played. In some embodiments, the content curation engine may organize and provide a list of the adjusted content items based on a profile of content preferences. In some embodiments, the content curation engine may organize a list of the adjusted content items based on a profile of content preferences and select a top match to provide.

FIG. 5 shows a generalized embodiment of illustrative device 500. As referred to herein, device 500 should be understood to mean any device that can receive input and other features from one or more of their devices, one or more network-connected devices, one or more electronic devices having a display, or provide content for consumption. As depicted in FIG. 5, device 500 is a smartphone, however, device 500 is not limited to smartphones or and may be any computing device. For example, device 500 of FIG. 5 can be in system 600 of FIG. 6 as device 602, including but not limited to a smartphone, a smart television, a tablet, a microphone (e.g., with voice control or a virtual assistant), a computer, or any combination thereof, for example.

Device 500 may be implemented by a device or system, e.g., a device providing a display to a user, or any other suitable control circuitry configured to generate a display to a user of content. For example, device 500 of FIG. 5 can be implemented as equipment 501. In some embodiments, equipment 501 may include set-top box 516 that includes, or is communicatively coupled to, display 512, audio equipment 514, and user input interface 510. In some embodiments, display 512 may include a television display or a computer display. In some embodiments, user interface input 510 is a remote-control device. Set-top box 516 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 500 and equipment 501 may receive content and receive data via input/output (hereinafter "I/O") path 502. I/O path 502 may provide content and receive data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communication paths (described below). I/O functions may be provided by one or more of these communication paths but are shown as a single path in FIG. 5 to avoid overcomplicating the drawing. While set-top box 516 is shown in FIG. 5 for illustration, any suitable computing device having processing circuitry, control circuitry, and storage may be used in accordance with the present disclosure. For example, set-top box 516 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application activity engine or a content curation engine stored in memory (e.g., storage 508). Specifically, control circuitry 504 may be instructed by the application to perform the functions discussed above and below. For example, the application may provide instructions to control circuitry 504 to generate the content guidance displays. In some implementations, any action performed by control circuitry 504 may be based on instructions received from the application.

In some client-server-based embodiments, control circuitry 504 includes communications circuitry suitable for communicating with an application server. An activity engine or a content curation engine may be a stand-alone application implemented on a device or a server. An activity engine or a content curation engine may be implemented as software or a set of executable instructions. The instructions for performing any of the embodiments discussed herein of the activity engine or content curation engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5, the instructions may be stored in storage 508, and executed by control circuitry 504 of a device 500.

In some embodiments, an activity engine or a content curation engine may be a client-server application where only the client application resides on device 500 (e.g., device 602), and a server application resides on an external server (e.g., server 606). For example, an activity engine or a content curation engine may be implemented partially as a client application on control circuitry 504 of device 500 and partially on server 606 as a server application running on control circuitry. Server 606 may be a part of a local area network with device 602 or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 606), referred to as "the cloud." Device 500 may be a cloud client that relies on the cloud computing capabilities from server 606 to determine times, identify one or more content items, and provide content items by a activity engine or a content curation engine. When executed by control circuitry of server 606, the client application may instruct control circuitry of the receiving device 602 to generate the activity engine output (e.g., activity duration and intensity scores). The content curation engine may instruct the control circuitry to generate the content curation engine output (e.g., content items and/or indicators) and transmit the generated output to device 602. Alternatively, device 602 may perform all computations locally via control circuitry 504 without relying on server 606.

Control circuitry 504 may include communications circuitry suitable for communicating with an activity engine server, an activity database server, a content curation engine server, a content database, or other networks or servers. The instructions for carrying out the above-mentioned functionality may be stored and executed on the application server 606. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 508 may be used to store various types of content described herein as well as content guidance data described above. Nonvolatile memory may also be used (e.g., to launch a boot-up routine and other instructions). Cloud-based storage, for example, (e.g., on server 606) may be used to supplement storage 508 or instead of storage 508.

A user may send instructions to control circuitry 504 using user input interface 510. User input interface 510, display 512 may be any suitable user interface touch-screen, touchpad, stylus and may be responsive to external device add-ons such as a remote control, mouse, trackball, keypad, keyboard, joystick, voice recognition interface, or other user input interfaces. Display 510 may include a touchscreen configured to provide a display and receive haptic input. For example, the touchscreen may be configured to receive haptic input from a finger, a stylus, or both. In some embodiments, equipment device 500 may include a front-facing screen and a rear-facing screen, multiple front screens, or multiple angled screens. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 516.

Audio equipment 510 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of each one of device 500 and equipment 501 or may be stand-alone units. An audio component of videos and other content displayed on display 512 may be played through speakers of audio equipment 514. In some embodiments, audio may be distributed to a receiver (not shown), which processes and outputs the audio via speakers of audio equipment 514. In some embodiments, for example, control circuitry 504 is configured to provide audio cues to a user, or other audio feedback to a user, using speakers of audio equipment 514. Audio equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504.

An application (e.g., for generating a display) may be implemented using any suitable architecture. For example, a stand-alone application may be wholly implemented on each one of device 500 and equipment 501. In some such embodiments, instructions of the application are stored locally (e.g., in storage 508), and data for use by the application is downloaded on a periodic basis (e.g., from an out-of-band feed, from an internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may monitor the words the user inputs in his/her messages for keywords and topics. In some embodiments, control circuitry 504 monitors user inputs such as texts, calls, conversation audio, social media posts, etc., to detect keywords and topics. Control circuitry 504 may store the detected input terms in a keyword-topic database and the keyword-topic database may be linked to the user profile. Additionally, control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the application is a client-server-based application. Data for use by a thick or thin client implemented on each one of device 500 and equipment 501 is retrieved on-demand by issuing requests to a server remote from each one of device 500 and equipment 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

As depicted in FIG. 6, device 602 may be coupled to communication network 604. Communication network 604 may be one or more networks including the internet, a mobile phone network, mobile voice or data network (e.g., a 4G or LTE network), cable network, public switched telephone network, Bluetooth, or other types of communication network or combinations of communication networks. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of JAVA-based files that are received and run by a local virtual machine or other suitable middleware executed by control circuitry 504.

In some embodiments, a system may include a user interface, with processing occurring remotely (e.g., at a network entity). In some embodiments, an application for displaying storyline information may be implemented on one or more devices that do not include user devices. In some embodiments, control circuitry is configured to access content, identify storylines, and generate for display an informational presentation arranged in suitable way. To illustrate, in some embodiments, law enforcement officers may view a screen of a virtual reality (VR) capable device that has access (e.g., network connectivity, or other communicative access) to a city video surveillance database. Using the VR device (e.g., a headset, personal device, smartphone connected to a wearable display), a police officer may browse and filter the video feeds recorded from a series of cameras around the city, by type of action recorded (e.g., via metadata tags), people identified in the sequences (e.g., via metadata tags), vehicles or license plates thereof shown in the video segments, any other attribute of the video segments, or any combination thereof. Accordingly, rather than a plot arc and characters, the storyline may include action type, persons, articles of clothing, vehicles, items (e.g., stolen property), or other identifiable attributes of video segments. Further, in some embodiments, rather than segments describing portions of episodes of a program, segments may refer to recordings or video clips (e.g., divided into segments in any suitable partition). Further, in some embodiments, rather than program title, the system may present information corresponding to a set of cameras or other video sources.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing content during an activity, the method comprising:
    receiving a first input including a start cue indicating a start of the activity;
    accessing an average duration and an intensity score for the activity;
    calculating an adjusted average runtime for the activity based on the average duration and the intensity score;
    identifying one or more content items, the one or more content items having a total runtime equivalent to the adjusted average runtime for the activity; and
    adjusting the playback speed of the identified one or more content items such that the total runtime of playback of the one or more content items matches the average duration for the activity.

2. The method of claim 1, wherein the adjusted average runtime includes a range of runtimes.

3. The method of claim 1, wherein the intensity score is associated with a range of acceptable playback speeds.

4. The method of claim 1, wherein the intensity score is associated with a range of acceptable playback speeds corresponding to a content type.

5. The method of claim 1, wherein the intensity score is associated with a range of acceptable playback speeds corresponding to a content genre.

6. The method of claim 1, wherein the accessing further includes accessing a maximum speed from a profile and the calculating an adjusted average runtime is further based upon the maximum speed.

7. The method of claim 1, wherein the accessing further includes accessing a plurality of maximum speeds from a profile, wherein each of the plurality of maximum speeds corresponds to a genre, and the calculating an adjusted average runtime is further based upon the plurality of maximum speeds.

8. The method of claim 1, wherein the accessing further includes accessing the average duration and the intensity score in an activity database.

9. The method of claim 1, wherein the input is sound.

10. The method of claim 9, wherein the intensity score is based on the sound.

11. A system for providing content during an activity, the system comprising:
    input/output circuitry configured to receive a first input including a start cue indicating a start of the activity;
    processing circuitry configured to access an average duration and an intensity score for the activity and calculate an adjusted average runtime for the activity based on the average duration and the intensity score; and
    second processing circuitry configured to identify one or more content items, the one or more content items having a total runtime equivalent to the adjusted average runtime for the activity, and to adjust the playback speed of the identified one or more content items such that the total runtime of playback of the one or more content items matches the average duration for the activity.

12. The system of claim 11, wherein the adjusted average runtime includes a range of runtimes.

13. The system of claim 11, wherein the intensity score is associated with a range of acceptable playback speeds.

14. The system of claim 11, wherein the intensity score is associated with a range of acceptable playback speeds corresponding to a content type.

15. The system of claim 11, wherein the intensity score is associated with a range of acceptable playback speeds corresponding to a content genre.

16. The system of claim 11, wherein the processing circuitry is further configured to access a maximum speed from a profile and calculate an adjusted average runtime further based upon the maximum speed.

17. The system of claim 11, wherein the processing circuitry is further configured to access a plurality of maximum speeds from a profile, wherein each of the plurality of maximum speeds corresponds to a genre, and to calculate an adjusted average runtime further based upon the plurality of maximum speeds.

18. A non-transitory computer-readable medium having instructions encoded thereon that when executed by control circuitry cause the control circuitry to:
- receive a first input including a start cue indicating a start of the activity;
- access an average duration and an intensity score for the activity;
- calculate an adjusted average runtime for the activity based on the average duration and the intensity score;
- identify one or more content items, the one or more content items having a total runtime equivalent to the adjusted average runtime for the activity; and
- adjust the playback speed of the identified one or more content items such that the total runtime of playback of the one or more content items matches the average duration for the activity.

19. The non-transitory computer-readable medium of claim 18, wherein the adjusted average runtime includes a range of runtimes.

\* \* \* \* \*